United States Patent
Pan et al.

(10) Patent No.: US 10,217,186 B2
(45) Date of Patent: Feb. 26, 2019

(54) METHOD, VIRTUAL REALITY APPARATUS AND RECORDING MEDIUM FOR DISPLAYING FAST-MOVING FRAMES OF VIRTUAL REALITY

(71) Applicant: HTC Corporation, Taoyuan (TW)

(72) Inventors: Sheng-Yang Pan, Taoyuan (TW); Ssu-Po Chin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 30 days.

(21) Appl. No.: 15/432,936

(22) Filed: Feb. 15, 2017

(65) Prior Publication Data

US 2018/0232852 A1    Aug. 16, 2018

(51) Int. Cl.
*G06T 3/20* (2006.01)
*G06T 3/60* (2006.01)
*G06F 3/01* (2006.01)
*G09G 5/38* (2006.01)

(52) U.S. Cl.
CPC ............... *G06T 3/20* (2013.01); *G06F 3/011* (2013.01); *G06T 3/60* (2013.01); *G09G 5/38* (2013.01); *G09G 2340/0464* (2013.01); *G09G 2340/14* (2013.01); *G09G 2354/00* (2013.01)

(58) Field of Classification Search
CPC ... G06T 3/20; G06T 3/60; G09G 5/38; G09G 2340/0464; G09G 2340/14; G09G 2354/00
See application file for complete search history.

(56) References Cited

U.S. PATENT DOCUMENTS

| | | | |
|---|---|---|---|
| 2010/0240454 A1 | 9/2010 | Xiao | |
| 2014/0176296 A1* | 6/2014 | Morgan | G06F 3/011 340/4.13 |
| 2015/0273179 A1* | 10/2015 | Krueger | A61M 21/02 600/27 |
| 2017/0003764 A1* | 1/2017 | Li | G06T 19/006 |

OTHER PUBLICATIONS

Stern, David P., "http://www.phy6.org/stargaze/Lrotfram.htm", Oct. 24, 2004.*

* cited by examiner

*Primary Examiner* — Michelle L Sams
(74) *Attorney, Agent, or Firm* — JCIPRNET

(57) ABSTRACT

A method, a virtual reality apparatus and a recording medium for displaying fast moving frames of virtual reality are provided. The method is adapted to a virtual reality apparatus including a head-mounted display (HMD), a locator and a computing device. In the method, the computing device executes an application of virtual reality, and displays frames of the application on the HMD. When fast moving of the frames of the application is about to be occurred, the computing device prompts the fast moving to guide a user wearing the HMD to turn a line of sight to a direction of gravity, and then fast moves a field of view of the frames to the direction of gravity.

13 Claims, 2 Drawing Sheets

METHOD, VIRTUAL REALITY APPARATUS AND RECORDING MEDIUM FOR DISPLAYING FAST-MOVING FRAMES OF VIRTUAL REALITY

BACKGROUND

Field of the Invention

The invention relates to a method and an apparatus for virtual reality, and particularly relates to a method, a virtual reality apparatus and a recording medium for displaying fast moving frames of virtual reality.

Description of Related Art

Virtual reality (VR) is a technique that uses computer simulation technology to produce a virtual world in a three-dimensional (3D) space. The virtual world is composed of computer graphics, and by displaying frames on a head-mounted display (HMD) worn by a user, and in collaboration with sensors set on user's body or set around, an artificial environment which is mainly based on visual perception in collaboration with perceptions of auditory and tactile is provided. The user experiencing the VR not only has a feeling of immersing in the virtual world in visual perception, but may also act in the virtual world, or even interact with objects in the virtual world as in the real world.

When the user wears the HMD, since the line of sight is obscured and the user cannot perceive the surroundings, an activity space of the user is limited. In order to act in the virtual world, a joystick is generally used for operation or a locator is used for spatial location, which may cause inconsistency of the visual perception and the body perception of the user, and result in dizziness. Especially when frames are quickly moved, it often causes different degrees of dizziness of the user.

SUMMARY

The application is directed to a method, a virtual reality apparatus and a recording medium for displaying fast moving frames of virtual reality, by which when virtual reality frames are about to be quickly moved, a line of sight of a user is guided to a direction of gravity, so as to avoid or mitigate a dizzy feeling caused by the fast moving frames.

The application provides a method for displaying fast moving frames of virtual reality, which is adapted to a virtual reality apparatus including a head-mounted display (HMD), a locator and a computing device. In the method, the computing device executes an application of virtual reality, and displays a plurality of frames of the application on the HMD. When fast moving of the frames of the application is about to be occurred, the computing device prompts the fast moving to guide a user wearing the HMD to turn a line of sight to a direction of gravity, and then fast moves a field of view of the frames to the direction of gravity.

In an embodiment of the application, the step of prompting the fast moving to guide the user wearing the HMD to turn the line of sight to the direction of gravity includes rotating the frames by the computing device to gradually move down a horizon in the frames, so as to guide the user to gradually turn the line of sight to the direction of gravity.

In an embodiment of the application, the step of executing the application of virtual reality and displaying the frames of the application on the HMD by the computing device further includes locating an activity space of the user by using the locator and creating a coordinate system of the activity space by the computing device.

In an embodiment of the application, the step of rotating the frames to gradually move down the horizon in the frames, so as to guide the user to gradually turn the line of sight to the direction of gravity includes rotating the coordinate system from a direction of the line of sight of the user to the direction of gravity according to a rotating angle between the frames and the rotated frames, such that a displacement of the user in the activity space detected by the locator directly corresponds to the rotated frames.

In an embodiment of the application, after the step of executing the application of virtual reality and displaying the frames of the application on the HMD by the computing device, the method further includes determining a time point of the fast moving of the application by the computing device, so as to prompt the fast moving during a period of predetermined time before the determined time point.

In an embodiment of the application, after the step of prompting the fast moving to guide the user wearing the HMD to turn the line of sight to the direction of gravity, the method further includes detecting a turning angle of the line of sight of the user turned to the direction of gravity by using the locator by the computing device, so as to change the field of view of the frames to fast move towards the direction of the turned line of sight.

The application provides a virtual reality apparatus including a HMD, a storage device and a computing device. The storage device is configured to record a plurality of modules. The computing device is coupled to the HMD and the storage device, and is configured to access and execute the modules recorded in the storage device. The modules include a frame generating module, a prompt module and a fast moving module. The frame generating module is configured to execute an application of virtual reality, and display a plurality of frames of the application on the HMD. The prompt module is configured to prompt fast moving to guide a user wearing the HMD to turn a line of sight to a direction of gravity when the fast moving of the frames of the application is about to be occurred. The fast moving module is configured to fast move a field of view of the frames to the direction of gravity.

In an embodiment of the application, the prompt module includes rotating the frames to gradually move down a horizon in the frames, so as to guide the user to gradually turn the line of sight to the direction of gravity.

In an embodiment of the application, the virtual reality apparatus further includes a locator, and the modules further include a space defining module, which locates an activity space of the user by using the locator, and creates a coordinate system of the activity space.

In an embodiment of the application, the space defining module further rotates the coordinate system from a direction of the line of sight of the user to the direction of gravity according to a rotating angle of the frames rotated by the prompt module, such that a displacement of the user in the activity space detected by the locator directly corresponds to the rotated frames.

In an embodiment of the application, the prompt module further determines a time point of the fast moving of the application, so as to prompt the fast moving during a period of predetermined time before the determined time point.

In an embodiment of the application, the space defining module further detects a turning angle of the line of sight of the user turned to the direction of gravity by using the locator, and the fast moving module changes the field of view of the frames to fast move towards the direction of the turned line of sight.

The application provides a computer readable recording medium used for recording a program, and the program is loaded by a virtual reality apparatus to execute following steps. A computing device executes an application of virtual reality, and displays a plurality of frames of the application on a HMD. When fast moving of the frames of the application is about to be occurred, the computing device prompts the fast moving to guide a user wearing the HMD to turn a line of sight to a direction of gravity, and then fast moves a field of view of the frames to the direction of gravity.

According to the above description, the method, the virtual reality apparatus and the recording medium for displaying fast moving frames of virtual reality prompt the user to turn the line of sight to the direction of gravity when fast moving of the frames of the application of the virtual reality is about to be occurred, such that by using the gravity acceleration, an acceleration direction perceived by user's body and an acceleration direction perceived by user's visual perception are consistent, so as to avoid or mitigate a dizzy feeling caused by the fast moving frames.

In order to make the aforementioned and other features and advantages of the application comprehensible, several exemplary embodiments accompanied with figures are described in detail below.

BRIEF DESCRIPTION OF THE DRAWINGS

The accompanying drawings are included to provide a further understanding of the application, and are incorporated in and constitute a part of this specification. The drawings illustrate embodiments of the application and, together with the description, serve to explain the principles of the application.

DESCRIPTION OF EMBODIMENTS

According to the application, when fast moving of frames of an application of virtual reality (VR) is about to be occurred, the user is prompted to turn a line of sight to a direction of gravity in advance, and then a field of view of the frames is fast moved to the direction of gravity, such that a moving direction of the frames is consistent with the direction of gravity perceived by user's body, so as to avoid or mitigate a dizzy feeling caused by the fast moving frames.

Figure 1:
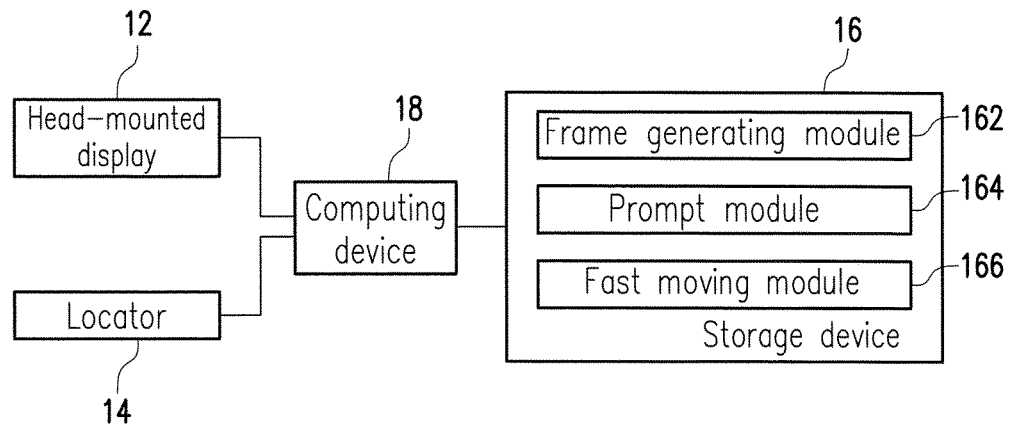
FIG. 1 is a block diagram of a virtual reality (VR) apparatus according to an embodiment of the application.

FIG. 1 is a block diagram of a VR apparatus according to an embodiment of the application. Referring to FIG. 1, the VR apparatus 10 of the present embodiment includes a head-mounted display (HMD) 12, a locater 14, a storage device 16 and a computing device 18, and functions thereof are respectively described below.

The HMD 12 is, for example, a liquid-crystal display (LCD), a light-emitting diode (LED) display or other suitable type of display, which is produced into a head-mounted type or a glass type for the user to wear on the head. The HMD 12 is further configured with sensors such as a gravity sensor, or a gyroscope, which are adapted to detect a rotating angle or a tilt angle of user's head, and feed back the same to the computing device 18. The computing device 18 may produce VR frames suitable for viewing in the rotation or tilt angle, and finally displays the VR frames on the HMD 12. In this way, the HMD 12 may display the VR frames of 360 degrees, and the user viewing the frames may have an immersive experience.

The locater 14, for example, includes a laser or infrared emitter and receiver, which is adapted to detect a distance of an object in a three-dimensional (3D) space, and in collaboration with a plurality of calibrators configured on the object (for example, the HMD 12), a position of the object in the 3D space can be located. The locater 14 can be disposed at a corner of the user's activity space, which is not only adapted to locate a position of the user in the 3D space, but is also adapted to define a boundary of the activity space. A position of the boundary can be displayed on the HMD 12 when the user approaches the boundary, so as to prompt the user to avoid walking out of the activity space or colliding with an object outside the activity space, for example, a wall of a room.

The storage device 16 can be any type of a fixed or movable random access memory (RAM), a read-only memory (ROM), a flash memory or a similar device or a combination of the aforementioned devices. In the present embodiment, the storage device 16 is configured to record a frame generating module 162, a prompt module 164 and a fast moving module 166, and these modules are, for example, programs stored in the storage device 16.

The computing device 18 is, for example, a computer device having a computing function such as a file server, a data server, an application program server, a work station or a personal computer, and includes a processor, where the processor is, for example, a central processing unit (CPU), or other programmable general purpose or special purpose microprocessors, a digital signal processor (DSP), a programmable controller, an application specific integrated circuits (ASIC), a programmable logic device (PLD) or other similar devices or a combination of the above devices. The computing device 18 is connected to the HMD 12, the locater 14 and the storage device 16, and configured to load the programs of the frame generating module 162, the prompt module 164 and the fast moving module 166 stored in the storage device 16 to execute a method for displaying fast moving frames of VR of the application.

It should be noted that in an embodiment, the storage device 16 and the computing device 18 are configured independent to the HMD 12, and are connected to the HMD 12 through a wired or wireless manner to transmit data. The storage device 16 can be configured in the computing device 18. In another embodiment, the storage device 16 and the computing device 18 can also be integrated in the HMD 12, and are connected to the HMD 12 through transmission lines for transmitting data, which is not limited by the application. Detailed steps of the method for displaying fast moving frames of VR of the application are described below.

Figure 2:
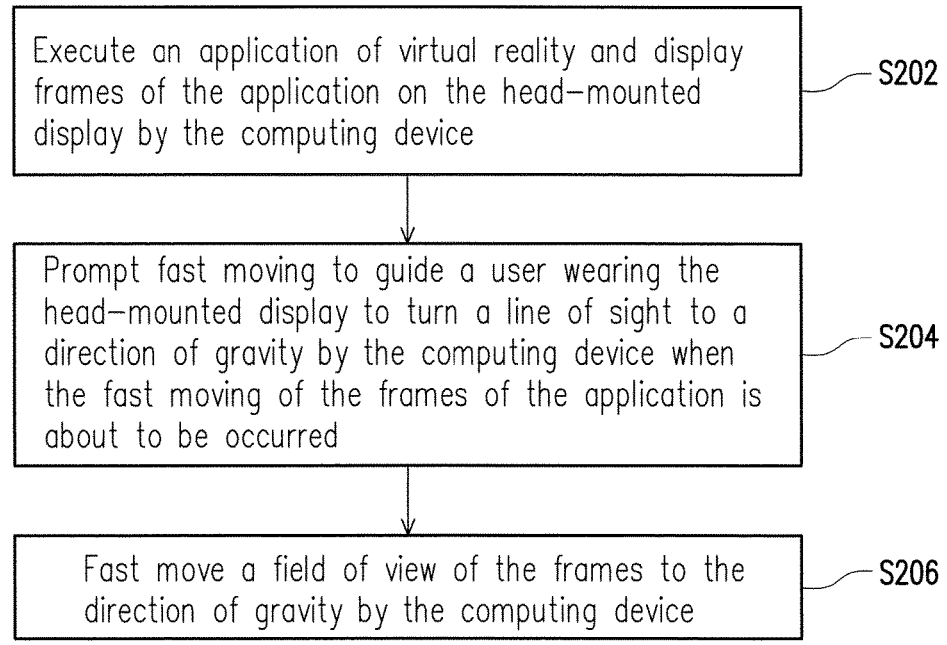
FIG. 2 is a flowchart illustrating a method for displaying fast moving frames of VR according to an embodiment of the application.

FIG. 2 is a flowchart illustrating a method for displaying fast moving frames of VR according to an embodiment of the application. Referring to FIG. 2, the method of the present embodiment is adapted to the VR apparatus 10 of FIG. 1, detailed steps of the method for displaying fast moving frames of VR of the embodiment are described below with reference of various components of the VR apparatus 10.

First, the computing device 18 executes the frame generating module 162 to execute an application of VR, and displays a plurality of frames of the application on the HMD 12 (step S202).

Then, the computing device 18 executes the prompt module 164, and when fast moving of the frames of the application is about to be occurred, the computing device 18 prompts the fast moving to guide the user wearing the HMD 12 to turn a line of sight to a direction of gravity (step S204). The prompt module 164, for example, determines a time point of the fast moving of the application, and prompts the fast moving during a period of predetermined time before the determined time point.

In detail, if the application executed by the computing device 18 uses the moving frame display mechanism provided by the method of the embodiment, the application may notify the computing device 18 to prompt before fast moving of the displayed content is about to be occurred. In an embodiment, the computing device 18 may adopt to prompt a message in the displayed frames or prompt the user via voice, vibration, etc., which is not limited by the application. In another embodiment, the computing device 18 may directly change the frames to guide the user to turn the line of sight. In detail, the computing device 18 may rotate the displayed frames to gradually move down a horizon in the frames viewed by the user, so as to guide the user to gradually move down the line of sight (i.e. the user's head gradually lower down) to the direction of gravity.

Finally, the computing device 18 executes the fast moving module 16 to fast move a field of view of the frames to the direction of gravity (step S206). Since the line of sight of the user has turned to the direction of gravity and is consistent with a moving direction of the frames, a gravity acceleration direction perceived by user's body is consistent with the moving direction perceived by user's visual perception, so as to avoid or mitigate a dizzy feeling caused by the fast moving frames.

It should be noted that since the line of sight of the user has turned to the direction of gravity, the action or movement of the user is also performed towards the direction of gravity. Therefore, in an embodiment, the coordinate system of the activity space of the user can be directly transferred to the direction of gravity, such that the action or displacement of the user detected by the computing device by using the locator 14 can be directly applied to the rotated frames.

In detail, before the user uses the VR apparatus 10, the VR apparatus 10 is first required to be initialized, where besides the HMD 12 is worn and the location of the HMD 12 is located, the locator 14 is further used to locate the activity space (for example, a room) of the user, so as to create the coordinate system of the activity space. In this way, the subsequent displacement or action of the user performed in the activity space can all be located by the locator 14 and converted into coordinate positions in the 3D space by the computing device 18, and then fed back to the frames displayed on the HMD 12 by the computing device 18, such that the user may interact with the VR frames.

When the line of sight of the user is turned to the direction of gravity according to the prompt of the computing device 18, the computing device 18 may rotate the coordinate system from a direction (which is generally a horizontal direction) of the line of sight of the user to the direction of gravity according to a rotating angle between the initial frames and the rotated frames, such that a displacement of the user in the activity space detected by the locator 14 may directly correspond to the rotated frames. In this way, error or shift caused by coordinate conversion of the location point is avoided.

On the other hand, based on differences on human body structures, user's habits and the activity spaces, a habitual viewing angle and a possible turning angle of each user are also different. Namely, when each user turns the line of sight to the direction of gravity, the line of sight is not necessary just turned to the direction of gravity, but includes a certain degree with the direction of gravity. Therefore, regarding the turning action of a different user, the computing device 18 of the present embodiment may use the locator 14 to detect the turning angle of the line of sight of the user turned to the direction of gravity, and when the computing device 18 fast moves the field of view of the frames, the computing device 18 changes the field of view of the frames to fast move towards the direction of the turned line of sight. In this way, the turned line of sight of the user can be consistent with the moving direction of the frames, so as to avoid or mitigate the dizzy feeling caused by the fast moving frames. The computing device 18 may further record the detected habitual turning angle of each user in the storage device 16, such that when the user uses the VR apparatus 10 next time, the rotating angle is automatically fed back to the prompt of the frames (i.e. guiding to the habitual turning angle of the user), so as to provide a better use experience to the user.

Figure 3A:
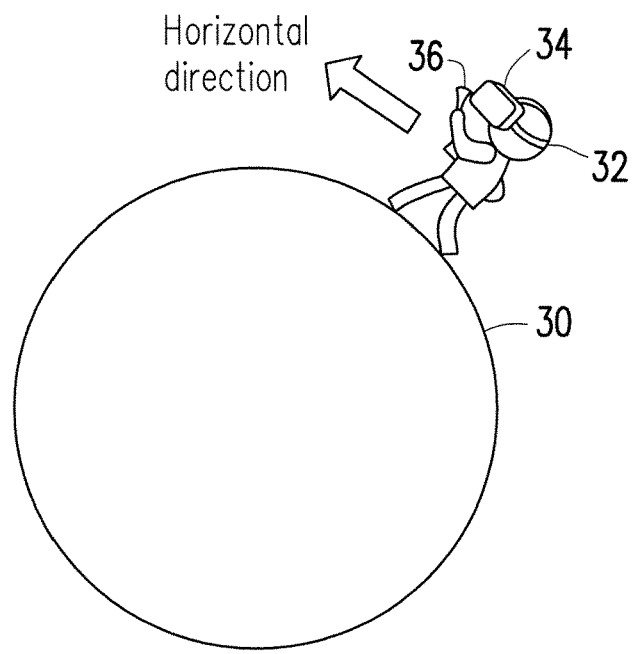
FIG. 3A and FIG. 3B illustrate an operation example of the VR apparatus according to an embodiment of the application.
Figure 3B:
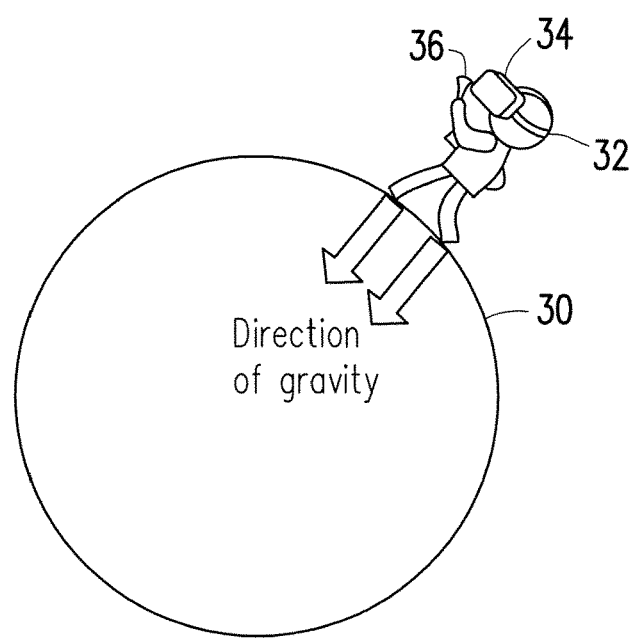

For example, FIG. 3A and FIG. 3B illustrate an operation example of the VR apparatus according to an embodiment of the application. Referring to FIG. 3A and FIG. 3B, a user 32 standing on the earth 30 wears a HMD 34 and holds a control joystick 36. An initial line of sight of the user 32 is maintained to straight ahead of the HMD 34 along a horizontal direction (as shown in. FIG. 3A). When the application executed by the VR apparatus is about to fast move the frames displayed by the HMD 34, for example, to change the frames displayed by the HMD 34, the line of sight of the user is guided to the direction of gravity (shown in FIG. 3B). After the line of sight of the user has been turned to the direction of gravity, the VR apparatus fast moves the field of view of the frames to the direction of gravity. Now, the user's body may feel the acceleration along the direction of gravity due to the gravity of the earth 30, and the visual perception of the user may feel the acceleration towards the direction of gravity due to the fast moving frames moved towards the direction of gravity. As the directions of the two perceptions are consistent, the user is not easy to have a dizzy feeling.

The application provides a computer readable recording medium, which records a computer program, where the computer program is configured to execute various steps of the aforementioned method for displaying fast moving frames of virtual reality. The computer program is composed of a plurality of program instructions (for example, an organization chart establishing program instruction, a table approving program instruction, a setting program instruction, and a deployment program instruction, etc), and after these program instructions are loaded into the VR apparatus and executed by the same, the various steps of the method for displaying fast moving frames of virtual reality are accomplished.

In summary, according to the method, the virtual reality apparatus and the recording medium for displaying fast moving frames of virtual reality of the application, the naturally existed gravity acceleration is applied to the VR, and when fast moving of the frames of the VR application is about to be occurred, by guiding the line of sight of the user to the direction of gravity, the user's body feels the gravity acceleration, and meanwhile the frames is fast moved towards the direction of gravity, such that the acceleration directions perceived by the user's body and visual perception are consistent, so as to avoid or mitigate a dizzy feeling caused by the fast moving frames.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A method for displaying fast-moving frames of virtual reality, adapted to a virtual reality apparatus comprising a head-mounted display (HMD), a locator and a computing device, the method for displaying fast-moving frames of virtual reality comprising:

executing an application of virtual reality and displaying a plurality of frames of the application on the HMD by a processor of the computing device;

when fast moving of a displayed content in the frames of the application is about to be occurred, prompting the fast moving of the displayed content to guide a user wearing the HMD to turn a line of sight to a direction of gravity by the processor of the computing device; and fast moving the displayed content in the frames with a field of view directed a to the direction of gravity by the processor of the computing device.

2. The method for displaying fast-moving frames of virtual reality as claimed in claim 1, wherein the step of prompting the fast moving of the displayed content to guide the user wearing the HMD to turn the line of sight to the direction of gravity comprises:

rotating the frames by the processor of the computing device to gradually move down a horizon in the frames, so as to guide the user to gradually turn the line of sight to the direction of gravity.

3. The method for displaying fast-moving frames of virtual reality as claimed in claim 2, wherein the step of executing the application of virtual reality and displaying the frames of the application on the HMD by the processor of the computing device further comprises:

locating an activity space of the user by using the locator and creating a coordinate system of the activity space by the processor of the computing device.

4. The method for displaying fast-moving frames of virtual reality as claimed in claim 3, wherein the step of rotating the frames by the processor to gradually move down the horizon in the frames, so as to guide the user to gradually turn the line of sight to the direction of gravity comprises:

rotating the coordinate system from a direction of the line of sight of the user to the direction of gravity according to a rotating angle between the frames and the rotated frames by the processor, such that a displacement of the user in the activity space detected by the locator directly corresponds to the rotated frames.

5. The method for displaying fast-moving frames of virtual reality as claimed in claim 1, wherein after the step of executing the application of virtual reality and displaying the frames of the application on the HMD by the processor of the computing device, the method further comprises:

determining a time point of the fast moving of the displayed content of the application by the processor of the computing device; and prompting the fast moving of the displayed content during a period of predetermined time before the determined time point.

6. The method for displaying fast-moving frames of virtual reality as claimed in claim 1, wherein after the step of prompting the fast moving of the displayed content to guide the user wearing the HMD to turn the line of sight to the direction of gravity, the method further comprises:

detecting a turning angle of the line of sight of the user turned to the direction of gravity by using the locator by the processor of the computing device; and changing the field of view of the displayed content in the frames to the detected direction of the turned line of sight and fast moving the displayed content in the frames with the field of view directed towards the direction of the turned line of sight.

7. A virtual reality apparatus, comprising:

a HMD;

a storage device, recording a plurality of modules; and a computing device having a processor, coupled to the HMD and the storage device, and configured to access and execute the modules recorded in the storage device by the processor for:

executing an application of virtual reality, and displaying a plurality of frames of the application on the HMD;

when fast moving of a displayed content in the frames of the application is about to be occurred, prompting the fast moving of the displayed content to guide a user wearing the HMD to turn a line of sight to a direction of gravity; and fast moving the displayed content in the frames with a field of view directed to the direction of gravity.

8. The virtual reality apparatus as claimed in claim 7, wherein the processor comprises rotating the frames to gradually move down a horizon in the frames, so as to guide the user to gradually turn the line of sight to the direction of gravity.

9. The virtual reality apparatus as claimed in claim 8, wherein the virtual reality apparatus further comprises a locator, and the processor further comprise:

locating an activity space of the user by using the locator, and creating a coordinate system of the activity space.

10. The virtual reality apparatus as claimed in claim 9, wherein the processor further rotates the coordinate system from a direction of the line of sight of the user to the direction of gravity according to a rotating angle of the frames, such that a displacement of the user in the activity space detected by the locator directly corresponds to the rotated frames.

11. The virtual reality apparatus as claimed in claim 7, wherein the processor further determines a time point of the fast moving of the displayed content of the application, so as to prompt the fast moving of the displayed content during a period of predetermined time before the determined time point.

12. The virtual reality apparatus as claimed in claim 7, wherein the processor further uses the locator to detect a turning angle of the line of sight of the user turned to the direction of gravity, and changes the field of view of the frames to fast move towards the direction of the turned line of sight.

13. A non-transitory computer readable recording medium, configured to record a program, wherein the program is loaded by a virtual reality apparatus to execute following steps:

executing an application of virtual reality and displaying a plurality of frames of the application on a HMD by a processor of a computing device;

when fast moving of a displayed content in the frames of the application is about to be occurred, prompting the fast moving of the displayed content to guide a user wearing the HMD to turn a line of sight to a direction of gravity by the processor of the computing device; and fast moving the displayed content in the frames with a field of view directed to the direction of gravity by the processor of the computing device.

* * * * *